United States Patent
Ishikawa et al.

(10) Patent No.: US 6,456,090 B1
(45) Date of Patent: Sep. 24, 2002

(54) TORQUE SENSOR

(75) Inventors: Takeshi Ishikawa, Maebashi (JP);
Toshiyuki Onizuka, Maebashi (JP);
Kouichi Sato, Maebashi (JP)

(73) Assignee: NSK Ltd., Tokyo (JP)

( * ) Notice: Subject to any disclaimer, the term of this patent is extended or adjusted under 35 U.S.C. 154(b) by 142 days.

(21) Appl. No.: 09/670,288

(22) Filed: Sep. 25, 2000

(30) Foreign Application Priority Data

Sep. 27, 1999 (JP) .......................................... 11-272690
Dec. 1, 1999 (JP) .......................................... 11-342111

(51) Int. Cl.$^7$ .............................. G01L 3/02; G01L 3/10
(52) U.S. Cl. ................... 324/546; 324/526; 73/862.331
(58) Field of Search ............................... 324/209, 219, 324/225, 233, 234–239, 526, 546; 73/862.333, 862.335, 862.331, 862.334, 650–660

(56) References Cited

U.S. PATENT DOCUMENTS 5,442,966 A * 8/1995 Hase et al. ............. 73/862.335
5,522,269 A * 6/1996 Takeda et al. .......... 73/862.333

FOREIGN PATENT DOCUMENTS

| JP | 09-189625 A | 7/1997 |
| JP | 09-189626 A | 7/1997 |
| JP | 10-019696 A | 1/1998 |
| JP | 10-038715 A | 2/1998 |

* cited by examiner

*Primary Examiner*—Christine Oda
*Assistant Examiner*—Amy He
(74) *Attorney, Agent, or Firm*—Sidley Austin Brown & Wood LLP

(57) ABSTRACT

A torque sensor includes a pair of detection coils having the impedances that change in opposite directions of each other corresponding to a torque generated in a rotation shaft. An AC voltage is applied on a bridge circuit including a pair of detection coils and a pair of resistors, a differential voltage between AC voltages that appear on both ends of the pair of detection coils is detected and sent out as the torque signal, and a failure of a circuit component of the torque detecting circuit is judged based on the phase difference between the waveform of the AC voltage applied on the bridge circuit and the waveform of the differential voltage between AC voltages that appear on both ends of the pair of detection coils.

8 Claims, 11 Drawing Sheets

TORQUE SENSOR

BACKGROUND OF THE INVENTION

1. Field of the Invention

This invention relates to a torque sensor for detecting a torque generated in a rotating shaft, and more particularly relates to an improved sensor for preventing erroneous detection due to malfunction of a torque detection circuit in a torque sensor provided with a pair of detection coils that change in impedance in the opposite direction of each other correspondingly to the generated torque.

2. Description of Prior Arts

A non-contact type torque sensor has been disclosed in Japanese Published Unexamined Patent Application No. Hei 10-38715 proposed previously by the applicant of the present invention.

In the conventional torque sensor disclosed in the above-mentioned Japanese Published Unexamined Patent Application, the displacement of a torsion bar proportional to the torque is converted into the change of inductance of the detection coil, and the change of inductance is detected by means of a bridge circuit comprising pairs of detection coils and resistors.

In other words, an AC voltage is applied on the bridge circuit provided with first and second arms comprising a pair of detection coils and a pair of resistors, the voltage difference between the output voltage of the junction point of the detection coil and resistor of the first arm and the output voltage of the junction point of the detection coil and resistor of the second arm is detected by means of a differential amplifier, and the torque signal is thereby obtained.

In the torque sensor having the above-mentioned structure, a pair of detection coils and a pair of resistors are connected to a printed wiring board so as to form a bridge circuit. The connection of the detection coil and the printed wiring board is usually secured by soldering. However, possible incomplete connection such as mis-soldering causes the increase of contact resistance between the detection coil and resistor and the printed wiring board, and incorrect torque signal is generated disadvantageously.

Furthermore, the resistance value of the resistor that is a component of the bridge circuit is regarded as a fixed value in the torque detection circuit, but actually the resistance value is changed due to damage of the resistor itself or with the lapse of time.

Such change in the resistance value of the resistor causes the detection circuit to detect it erroneously as if the impedance of the detection coil changes, and as the result an erroneous signal is generated.

Therefore, it has been expected to realize a highly reliable torque sensor that is capable of detecting the erroneous operation when the torque sensor is involved in malfunction.

SUMMARY OF THE INVENTION

It is the main object of the present invention to provide a highly reliable non-contact type torque sensor for detecting a torque generated in a rotating shaft that judges the malfunction of a circuit component of the torque detection circuit based on the state of the output signal of the torque detection circuit and prevents the erroneous detection of the torque.

It is another object of the present invention to provide a highly reliable torque sensor for detecting failure of the circuit component of the torque detecting circuit provided with a pair of detection coils having impedances that change in the opposite direction of each other corresponding to the generated torque, in which an AC voltage is applied on a bridge circuit comprising a pair of detection coils and a pair of resistors, the differential voltage between AC voltages that appear on both ends of the pair of detection coils is detected and sent out as the torque signal, and the failure of the circuit component of the torque detecting circuit is judged based on the phase difference between the waveform of the AC voltage applied on the bridge circuit and the waveform of the differential voltage between AC voltages that appear on both ends of the pair of detection coils, and thus the erroneous detection of the torque is prevented.

It is another object of the present invention to provide a highly reliable torque sensor for detecting failure of the circuit component of the torque detecting circuit provided with a pair of detection coils having impedances that change in the opposite direction of each other corresponding to the generated torque, in which an AC voltage is applied on a bridge circuit having a pair of detection coils and a pair of resistors, each resistor comprising two resistor elements connected in series, and the failure of the circuit component of the torque detecting circuit is judged based on the differential signal between the main torque signal that is the differential voltage between the AC voltage that appears on both ends of the pair of detection coils of the bridge circuit and the input AC voltage and the sub torque signal that is the differential voltage between the AC voltage that appears on the middle point between two resistor elements that constitute the pair of resistors of the bridge circuit and the input AC voltage, and thus the erroneous detection of the torque is prevented.

Other objects of the present invention will be apparent from the detailed description of the invention with reference to the drawings.

DETAILED DESCRIPTION OF THE PREFERRED EMBODIMENTS

Examples of the present invention will be described in detail hereinafter with reference to the drawings. The example described hereinafter is an electric power steering apparatus for vehicles to which a torque sensor in accordance with the present invention is applied.

Figure 1:
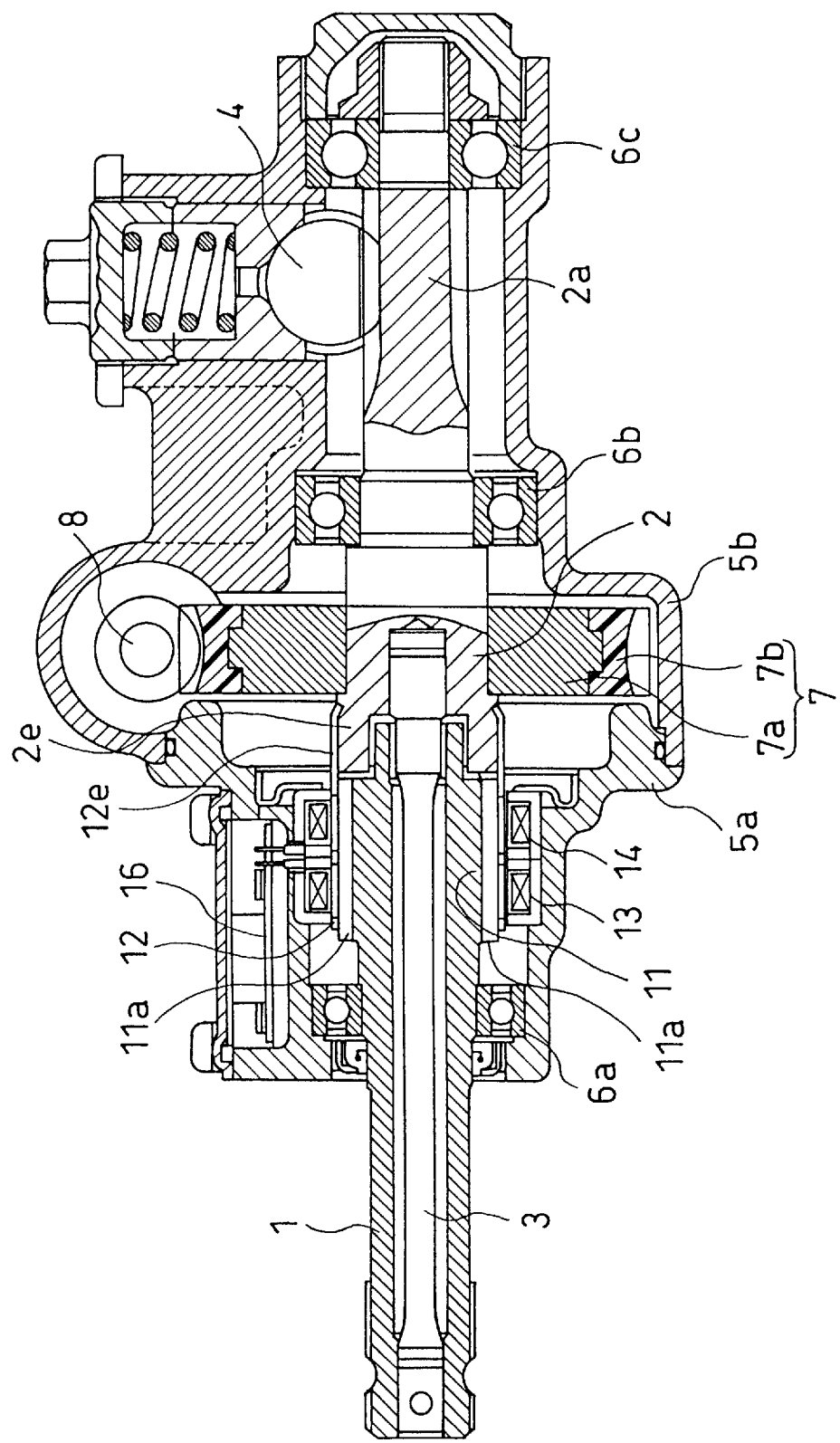
FIG. 1 is a cross sectional view illustrating a structure of an electric power steering apparatus.
Figure 2:
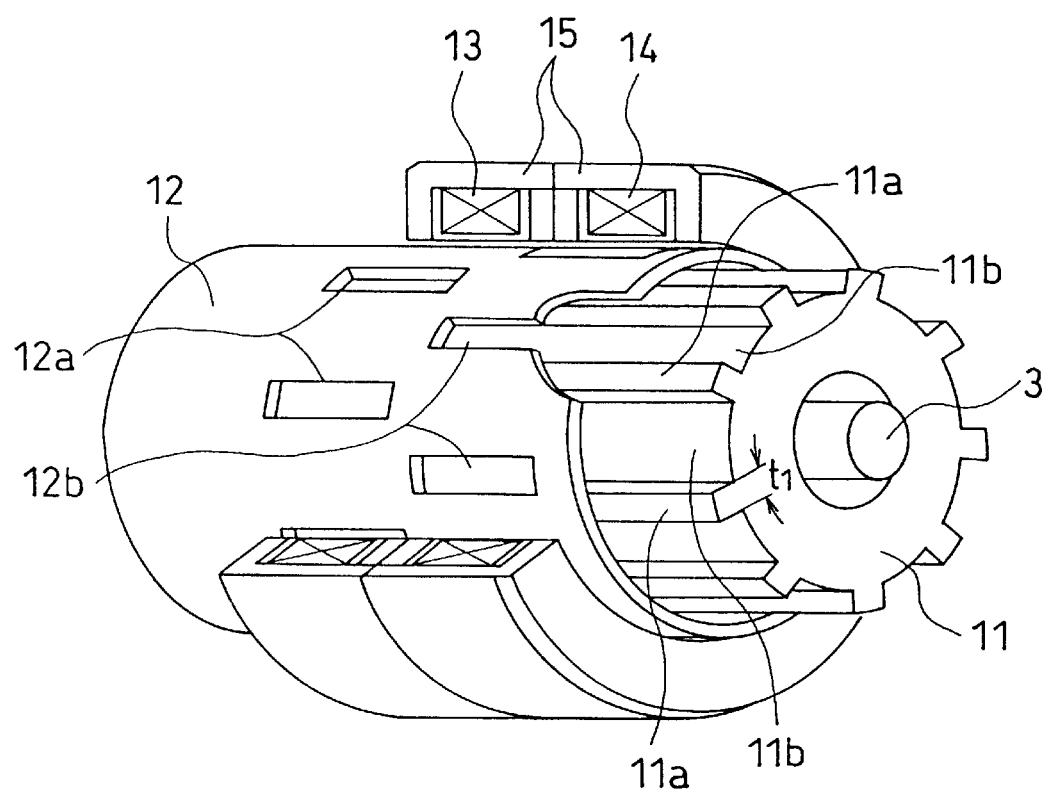
FIG. 2 is a perspective view illustrating the structure of a torque sensor of the electric power steering apparatus.

FIG. 1 is a cross sectional view illustrating a structure of an electric power steering apparatus including a torque detection unit, and FIG. 2 is a perspective view illustrating the structure of the torque detection unit.

In FIG. 1, 5a and 5b denote a housing having the two-divided structure comprising the input shaft side 5a and output shaft side 5b. In the inside of the housing 5a and 5b, an input shaft 1, torsion bar 3 located therein, and an output shaft 2 coupled to the input shaft 1 with interposition of the torsion bar 3 are supported rotatably on bearing 6a, 6b, and 6c.

The input shaft 1, the torsion bar 3, and output shaft 2 are located coaxially, the input shaft 1 and the torsion bar 3 are spline-coupled to each other, and the torsion bar 3 and the output shaft 2 are spline-coupled to each other. In FIG. 1, a steering wheel not shown in the drawing is fixed solidly on the left end side of the input shaft 1. A pinion shaft 2a is formed on the output shaft 2, and the pinion shaft 2a is engaged with a rack 4 to thereby structure a public known rack and pinion type steering mechanism.

A worm wheel 7 is fixed to the output shaft 2 so as to rotate co-axially together with the output shaft 2, and is engaged with a worm 8 that is to be driven by means of an electric motor not shown in the drawing. The worm wheel 7 comprises a metal hub 7a and a tooth 7b consisting of synthetic resin that are fixed together solidly. The rotational force of the electric motor is transmitted to the output shaft 2 by way of the worm 8 and the worm wheel 7, and an auxiliary steering torque is exerted on the output shaft 2 in the arbitrary direction by switching the rotation direction of the electric motor suitably.

Next, the structure of the torque detection unit of the torque sensor will be described with reference to FIG. 1 and FIG. 2. The torque detection unit comprises a sensor shaft 11 of the input shaft 1 formed on the right end side in FIG. 1, detection coils 13 and 14 disposed inside the housing 5a, and a cylindrical member 12 interposed between the sensor shaft 11 and detection coils 13 and 14.

FIG. 2 is a perspective view illustrating the structure of the torque detection unit. The sensor shaft 11 consisting of magnetic material is formed on the outside of the input shaft 1 near the right end in FIG. 1, a plurality of ridges 11a (nine ridges are shown in the example) extending in the axis direction are formed along the circumferential direction at equal intervals on. the surface of the sensor shaft 11, and grooves 11b having a width wider than the width t1 of the ridges 11a are formed between the respective ridges 11a.

The cylindrical member 12 consisting of conductive and non-magnetic material, for example, aluminum is disposed co-axially with the sensor shaft 11 near the sensor shaft 11 on the outside of the sensor shaft 11, and the extension 12e of the cylindrical member 12 is fixed to the outside of the end 2e of the output shaft 2.

The first window array comprising a plurality of rectangular windows 12a (nine windows are shown in the present example) disposed at equal intervals in the circumferential direction at the position facing to the ridges 11a on the surface of the above-mentioned sensor shaft 11 and the second window array comprising a plurality of rectangular windows 12b (nine windows are shown in the present example) having the same shape as that of the above-mentioned windows 12a but being located at the phase different from that of the above-mentioned windows 12a at the position deviating in the axis direction from the above-mentioned first window array are provided.

The outer periphery of the cylindrical member 12 is surrounded by a yoke 15 on which detection coils 13 and 14 having the same specification are wound. In other words, the detection coils 13 and 14 are disposed co-axially with the cylindrical member 12, the detection coil 13 surrounds the first window array portion comprising windows 12a and the detection coil 14 surrounds the second window portion comprising the windows 12b. The yoke 15 is fixed in the housing 5a, and the output line is connected to the circuit board 16 disposed in the housing 5a.

Figure 3A:
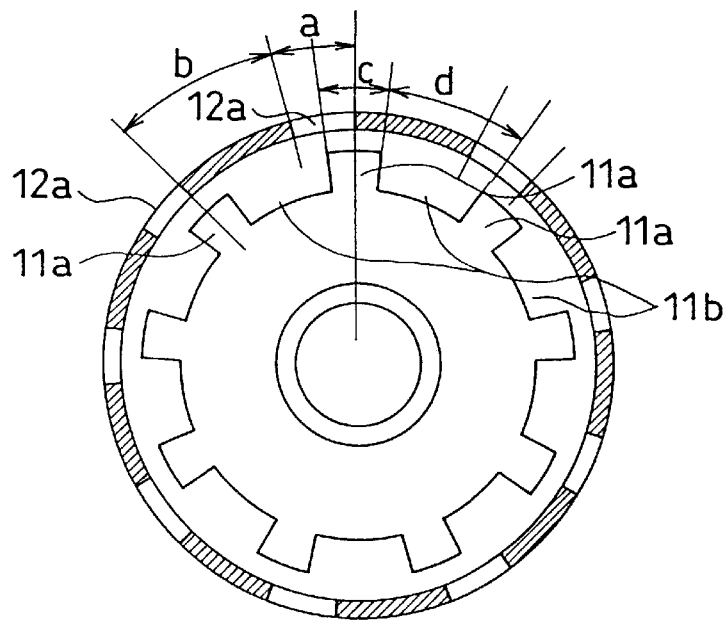
FIG. 3(a) and FIG. 3(b) are diagrams illustrating window location of a ridge and a cylindrical member on the surface of a sensor shaft
Figure 3B:
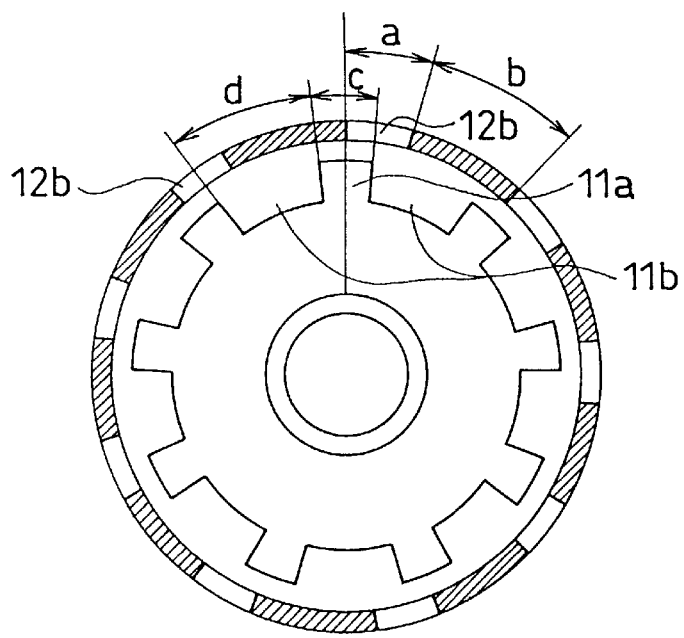

FIG. 3(a) and FIG. 3(b) are diagrams showing the window layout of the ridges on the surface of the sensor shaft and the cylindrical member, FIG. 3(a) shows the positional relation between the ridges 11a on the surface of the sensor shaft 11 and the windows 12a of the first window array of the cylindrical member 12 in the basic position (the position without displacement of the torsion bar 3); on the other-hand, FIG. 3(b) shows the positional relation between the ridges 11a on the surface of the sensor shaft 11 and the windows 12b of the second window array of the cylindrical member 12 in the basic position (the position without displacement of the torsion bar 3).

In the present example, nine windows 12a and nine windows 12b are provided, so the windows 12a of the first window array and the windows 12b of the second window array are deviated by angle θ=360/N degrees (in the example shown in FIG. 2, FIG. 3(a), and FIG. 3(b), the angle θ=360/9=40 degrees) respectively in the circumferential direction.

The angle a of the windows 12a and 12b are smaller than the angle b of the portion without the windows 12a and 12b (a<b), the angle c of the ridge 11a is smaller than the angle d of the groove 11b (c<d). The reason is that the change of impedance of the detection coil is steepened desirably.

As it is obvious from FIG. 3 (a) and FIG. 3(b), in the state that the torsion bar 3 is not twisted, namely in the state that the steering torque is zero (0), the relative positional relation in the circumferential direction between the width of the windows 12a and 12b in the circumferential direction and width of the ridges 11a and windows 12a and 12b is set so that the one end of the ridges 11a of the sensor shaft 11 in the circumferential direction is positioned at the center portion of the width of the windows 12a in the circumferential direction, and the other end of the ridges 11a in the circumferential direction is positioned at the center portion of the width of the windows 12b in the circumferential direction. In other words, the positional relation of the windows 12a and 12b with respect to the ridges 11a is opposite each other in the circumferential direction.

When the steering system is in the state of straight running, no torsion is exerted on the torsion bar 3 and the input shaft 1 and the output shaft are not rotated relatively. Therefore, the relative rotation between the ridges 12a on the surface of the sensor shaft 11 of the input shaft 1 side and the cylindrical member 12 of the output shaft 2 side is not generated.

On the other hand, when a steering wheel is operated and a rotational force is exerted on the input shaft 1, the rotational force is transmitted to the output shaft 2 by way of the torsion bar 3. At that time, the frictional force between the steering wheel and road surface and the frictional force due to engagement between gears of the steering mechanism linked to the output shaft 2 are exerted on the output shaft 2, and such frictional force causes the displacement of the torsion bar that couples between the input shaft 1 and the output shaft 2, and causes the relative rotation between the ridges 11a on the surface of the sensor shaft 11 of the input shaft 1 side and the cylindrical member 12 of the output shaft 2 side.

Because the cylindrical member 12 consists of conductive and non-magnetic material if no window is formed on the cylindrical member 12, an eddy current is generated on the outer peripheral surface of the cylindrical member 12 in the opposite direction to the coil current when an AC current is supplied to the detection coils 13 and 14 to generate an AC magnetic field. When the magnetic field due to the eddy current and the magnetic field due to the coil current are superimposed, the magnetic field inside the cylindrical member 12 is offset.

If the window is formed on the cylindrical member 12, the eddy current generated on the outer peripheral surface of the cylindrical member 12 cannot go round the outer peripheral surface due to the blockade by the windows 12a and 12b, but go round both sides of the inner periphery of the cylindrical member 12 along the end surfaces of the windows 12a and 12b, and flows on the inner peripheral surface in the same direction as that of the coil current, and furthermore returns to both sides of the outer periphery along the end surfaces of the adjacent windows 12a and 12b to thereby form a loop. In other words, the state in which the eddy current loop is disposed periodically on the inside of the detection coils in the circumferential direction is generated.

The magnetic field due to the coil current and the magnetic field due to the eddy current are superimposed, and the magnetic field having the magnitude changing periodically in the circumferential direction and the magnetic field having the gradient magnitude decreasing toward the center in the radial direction are formed on the outside and inside of the cylindrical member 12 respectively. The periodical fluctuation magnitude of the magnetic field in the circumferential direction is larger at the center of the windows 12a and 12b that are affected by the adjacent eddy currents and is smaller at the position farther from the center.

The sensor shaft 11 consisting of magnetic material is disposed co-axially in the inside of the cylindrical member 12, and the ridges 11a are disposed with the same interval as that of the windows 12a and 12b.

The magnetic object placed in a magnetic field generates a magnetic flux, and the magnitude of the magnetic flux increases up to the saturation as the magnitude of the magnetic field increases. Therefore, the magnitude of the magnetic flux generated in the sensor shaft 11 associated with the magnetic field having the magnitude changing periodically in the circumferential direction and the magnetic field having the gradient magnitude decreasing toward the center in the radial direction changes correspondingly to the relative phase between the cylindrical member 12 and the sensor shaft 11.

The magnetic flux is maximized at the phase where the center of the windows 12a and 12b of the cylindrical member 12 coincides with the center of the ridges 11a of the sensor shaft 11, the inductance of the detection coils 13 and 14 is changed corresponding to the change of the magnetic flux, and changes in the shape similar to the sine wave.

Because the center of the ridges 11a of the sensor shaft 11 is set at the position so as to deviate by ½ of the central angle c of the ridges 11a with respect to the phase where the inductance is maximized (the phase where the center of the windows 12a and 12b coincides with the center of the ridges 11a) in the state when no torque is exerted, when a torque is exerted and the torsion bar 3 is displaced concomitantly, and the phase difference occurs between the sensor shaft 11 and the cylindrical member 12, the impedance of any one of the detection coils 13 and 14 increases and on the other hand the impedance of the other of the detection coils 13 and 14 decreases.

Figure 4:
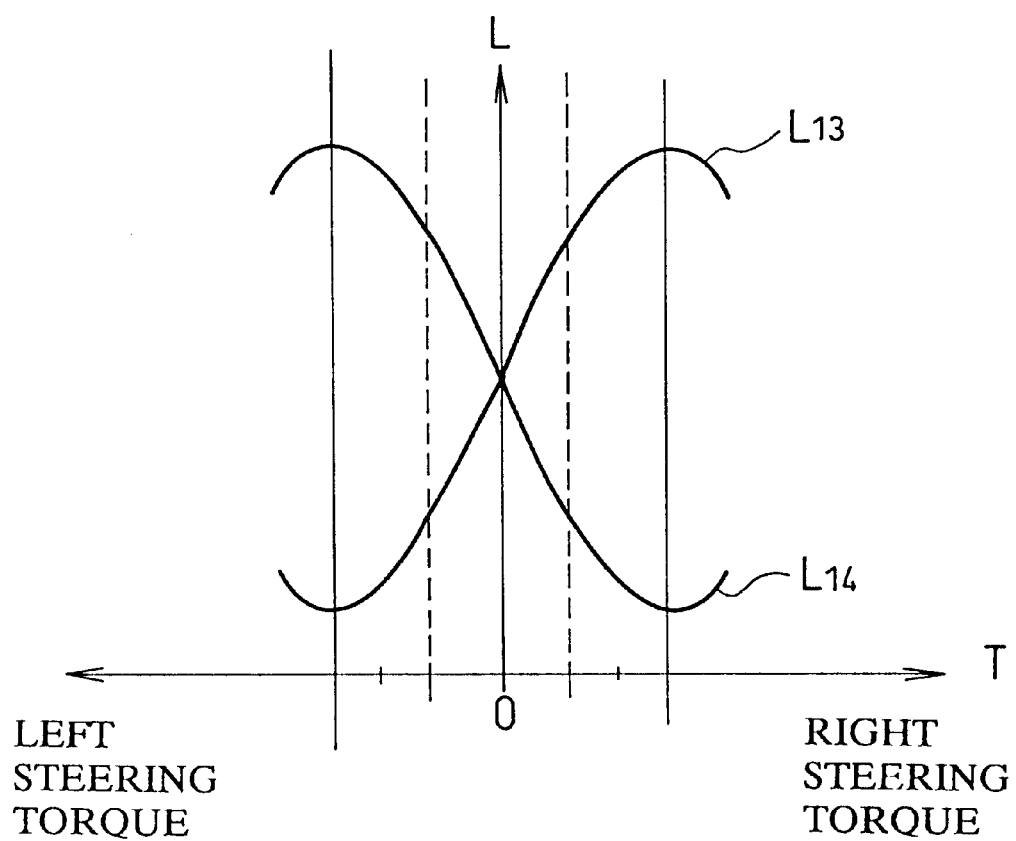
FIG. 4 is a diagram showing the magnitude change of the torque and the inductance change of two detection coils.

FIG. 4 is a diagram for describing the magnitude change of the torque and the inductance of the detection coils 13 and 14, the axis of abscissa represents the torque T and the axis of ordinate represents the inductance L. The cylindrical member 12 is rotated clockwise in FIG. 3(a) and FIG. 3(b) when the right steering torque is generated, the inductance L13 of the detection coil 13 increases with increasing of torque as shown in FIG. 4, on the other hand the inductance L14 of the detection coil 14 decreases.

On the other hand, the cylindrical member 12 is rotated counterclockwise in FIG. 3(a) and FIG. 3(b) when the left steering torque is generated, the inductance L13 decreases with increasing of torque, on the other hand the inductance L14 of the detection coil 14 increases.

Figure 5:
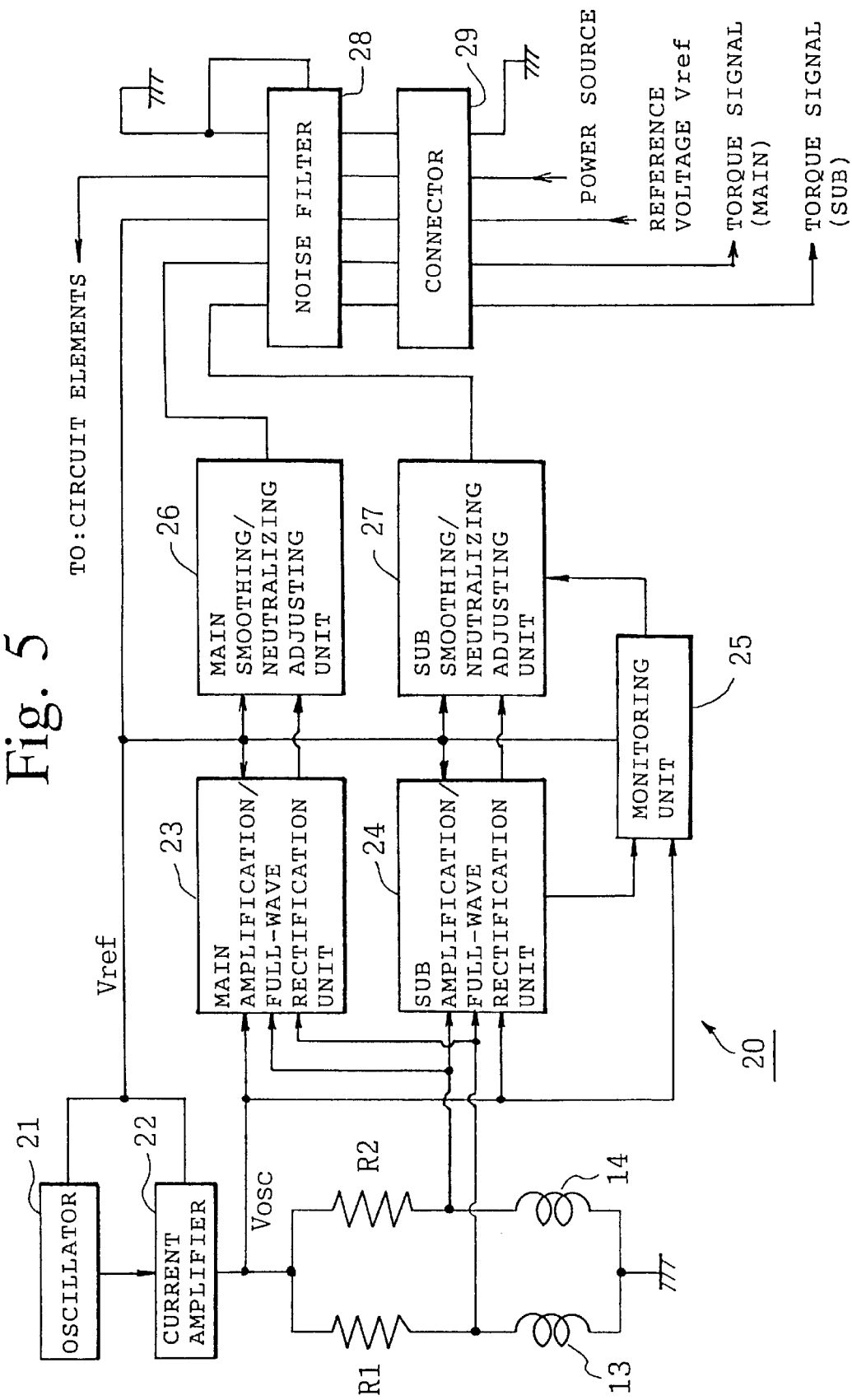
FIG. 5 is a block diagram of a torque detection circuit.

FIG. 5 is a block diagram of the torque detection circuit. A torque detection circuit 20 is connected to a controller not shown in the drawing by way of a connector 29, the power source voltage V and the reference voltage Vref are supplied from the controller to each circuit components by way of a noise filter 28, and the detected main detection torque signal and sub detection torque signal are supplied to the controller.

A bridge circuit for detecting the torque comprises the first arm to which the detection coil 13 and resistor R1 are confected in series and the second arm to which the detection coil 14 and resistor R2 are connected in series.

An oscillator 21 receives the power source voltage V and the reference voltage Vref to generate an AC voltage having a predetermined frequency. The generated AC voltage is amplified by means of a current amplifier 22, and the amplified AC voltage Vosc is supplied to the first arm of the bridge circuit comprising the detection coil 13 and resistor R1 and the second arm of the bridge circuit comprising the detection coil 14 and resistor R2. Herein, the value of the resistors R1 and R2 is adjusted previously so that the voltages on both ends of the detection coils 13 and 14 are equal each other while the torque is not being exerted.

The voltages appearing on both ends of the detection coil 13 and the detection coil 14 are converted to a differential signal between both detection coils, and then amplified and rectified by means of a main amplification/full-wave rectification unit 23, the output waveform of the differential signal is adjusted by means of a main smoothing/neutralizing adjusting unit 26, and then supplied to the controller by way of the noise filter 28 as the main detection torque signal.

The voltages signal appearing on both ends of the detection coil 13 and the detection coil 14 are converted to a differential signal Vdef between both detection coils, and amplified and rectified by means of a sub amplification/full-wave rectification unit 24, and furthermore the output waveform of the differential signal Vdef is adjusted by means of a sub smoothing/neutralizing adjusting unit 27, and then supplied to the controller by way of the nose filter 28 as the sub detection torque signal.

The reason why the torque detection circuit 20 comprises the two sets, namely a set of the main amplification/full-wave rectification unit 23 and the main smoothing/neutralizing adjusting unit 26, and a set of the sub amplification/full-wave rectification unit 24 and the sub smoothing/neutralizing adjusting unit 27, to generate two signal sets is that these two signal sets are compared by means of a control circuit not shown in the drawing to thereby detect the malfunction or the like of the circuit components.

Furthermore, in the torque detection circuit 20, a monitoring unit 25 is provided between the sub amplifier/full-wave rectifying unit 24 and sub smoothing/neutralizing adjusting unit 27. The monitoring unit 25 is provided to detect the malfunction of the torque detection circuit such as increased contact resistance due to contact failure between the detection coil 13 or 14 and the resistor R1 or R2. The structure and operation of the monitoring unit 25 will be described herein under.

Figure 6:
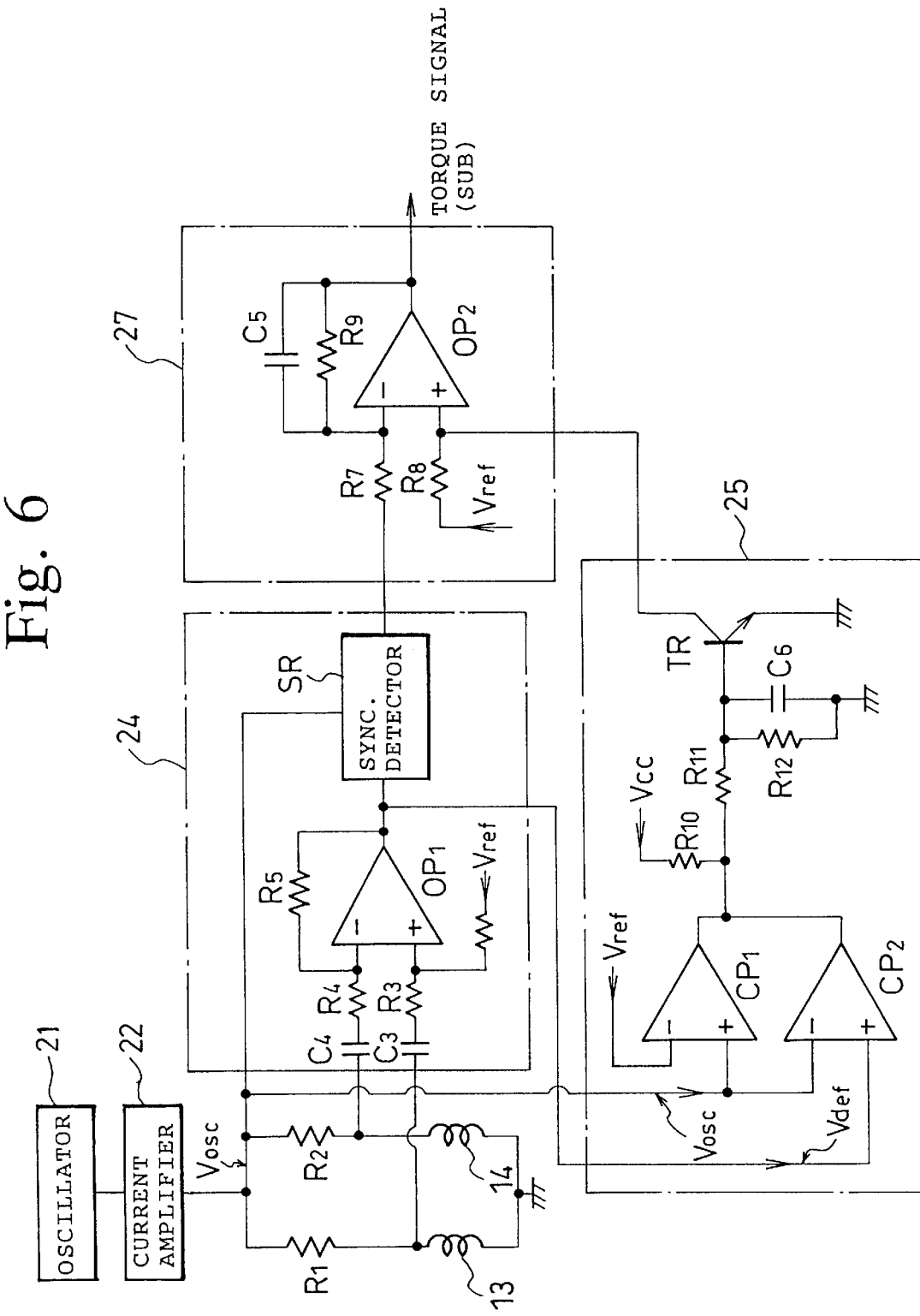
FIG. 6 is a block diagram of a monitoring unit and related circuits.

FIG. 6 is a block diagram of the monitoring unit 25 and peripheral circuits thereof. The sub amplifying/full wave rectifying unit .24 comprises an operational amplifier OP1 and a sync detector SR. A reference voltage Vref is connected to the input (+) terminal of the operational amplifier OP1, and the output of the operational amplifier OP1 is fedback to the input (−) terminal of the operational amplifier OP1 by way of a resistor R5.

The voltages that appear on both ends of the detection coils 13 and 14 are applied to the input (+) terminal and the input (−) terminal of the operational amplifier OP1, respectively by way of a capacitor C3, a resistor R3, a capacitor C4, and a resistor R4, and the differential signal Vdef is generated.

The output signal Vdef of the operational amplifier OP1 is rectified by means of the sync detector SR synchronously with an AC current generated by means of the oscillator and supplied by way of the current amplifier 22, and then supplied to the sub smoothing/neutralizing adjusting unit 27.

The sub smoothing/neutralizing adjusting unit 27 comprises an operational amplifier OP2, a capacitor C5, and a resistor R9, the reference voltage Vref is connected to the input (+) terminal of the operational amplifier OP2 by way of the resistor R8, and the output of the sync detector SR is supplied to the input (−) terminal of the operational amplifier OP2 by way of the resistor R7. The output of the operational amplifier OP2 is fed back to the input (−) terminal by way of the capacitor C5 and the resistor R9, and the detected torque signal is sent out after smoothing and waveform adjustment.

The monitoring unit 25 comprises two comparators CP1 and CP2 and a transistor TR, and a resistor R10 that is connected to a constant voltage Vcc. A resistor R12, and a capacitor C6 are interposed between the output sides of the comparators CP1 and CP2 and the base of the transistor TR.

An AC voltage Vosc generated by means of the oscillator 21 and supplied by way of the current amplifier 22 is supplied to the input (+) terminal, and the reference voltage Vref is supplied to the input (−) terminal of the comparator CP1. Furthermore, the output signal Vdef of the operational amplifier OP1 is supplied to the input (+) terminal of the comparator CP2, and the AC voltage Vosc generated by means of the oscillator 21 is applied on the input (−) terminal of the comparator CP2. The respective outputs of the comparators CP1 and CP2 are composed and the composite waveform is supplied to the base of the transistor TR.

Figure 7:
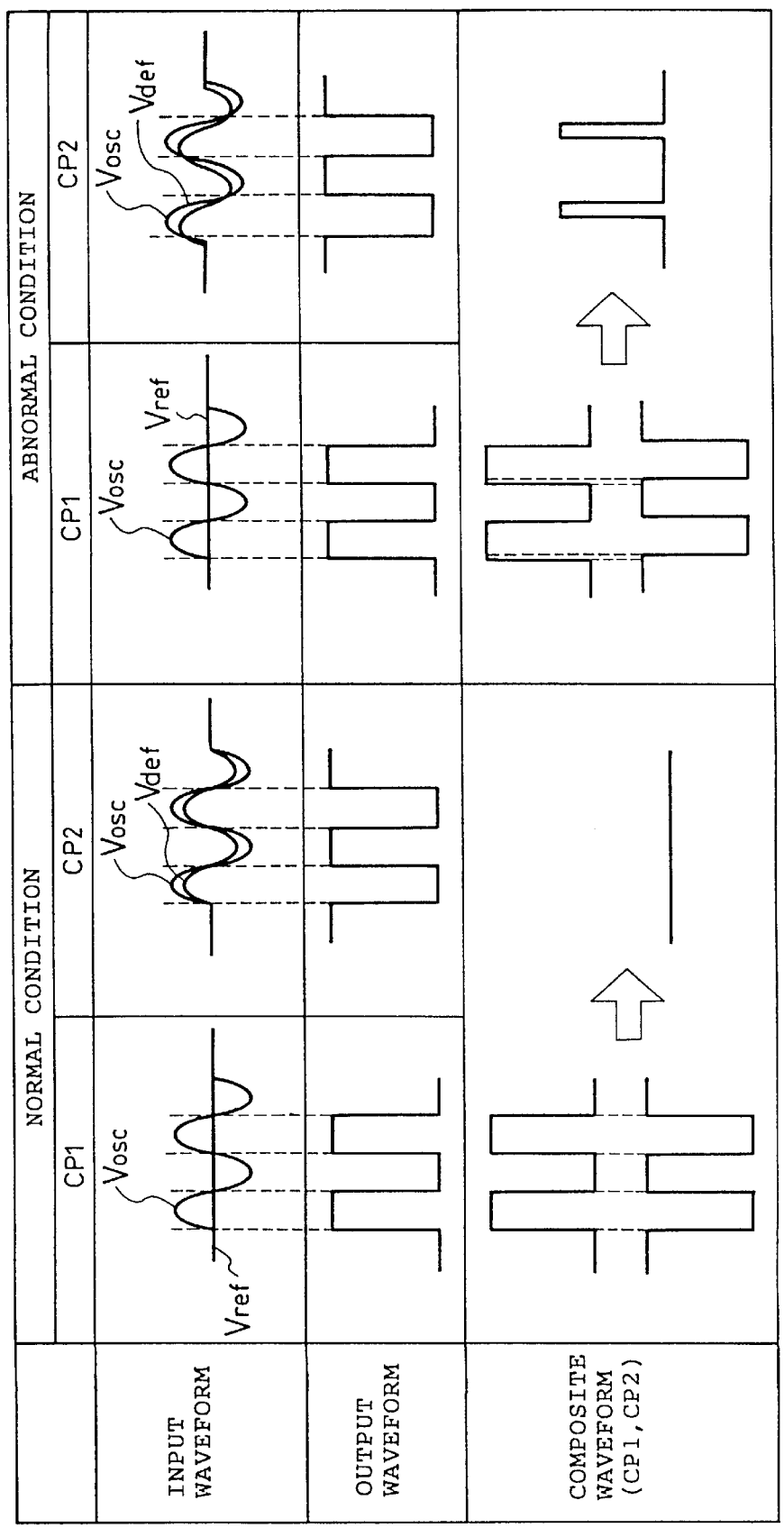
FIG. 7 is a diagram showing the input waveform, output waveform, and output synthesis waveform of a comparator CP1 and CP2 in normal condition and abnormal condition.

FIG. 7 shows respective diagrams of the input waveform, the output waveform of the comparators CP1 and CP2, and composite waveform of the outputs of the comparators CP1 and CP2 in normal condition and abnormal condition respectively. Herein, the normal condition means the state in which no contact failure occurs between the detection coil 13 or 14 and the resistor R1 or R2, on the other hand the abnormal condition means the state in which some contact failure occurs to cause increased contact resistance. The operation during normal condition and during abnormal condition will be described herein under with reference to FIG. 7.

At first, the operation during the normal condition will be described. During the normal condition, because no contact failure occurs between the detection coil 13 or 14 and the resistor R1 or R2 (no abnormal condition occurs), the voltages that appear on both ends of the detection coils 13 and 14 are equal each other and have no phase difference, the reference voltage Vref (sine wave) is generated from the operational amplifier OP1.

The AC voltage Vosc generated by means of the oscillator 21 and supplied by way of the current amplifier 22 is applied on the input (+) terminal of the comparator CP1 and the reference voltage Vref is applied to the input (−) terminal of the comparator CP1, and as the result the input waveform is sine wave and the output waveform that is generated at that time is the positive potential rectangular waveform.

The output signal Vdef (sine wave) of the operational amplifier OP1 is supplied to the input (+) terminal of the comparator CP2 and the AC voltage Vosc generated by means of the oscillator 21 and supplied by way of the current amplifier 22 is applied on the input (−) terminal of the comparator CP2, as the result the input waveform is sine wave and the out put waveform that is generated at that time is the negative potential rectangular waveform, and has the same phase as that of output waveform of the comparator CP1.

Therefore, the composite waveform of the outputs of the comparators CP1 and CP2 is not involved in the phase deviation between the output waveforms but involved in zero output as the result of cancellation between the positive potential and the negative potential, the constant voltage Vcc is applied on the base of the transistor TR and the transistor TR remains OFF. The OFF of the transistor TR means that a control signal is not generated from the monitoring unit 25 when an abnormal operation is detected.

Because the monitoring unit 25 is in the state that abnormality is not detected and the transistor TR remains OFF, the reference voltage Vref is applied to the input (+) terminal of the operational amplifier OP2 of the sub smoothing/ neutralizing adjusting unit 27, and as the result the output of the sub amplifying/full wave rectifying unit 24 is sent out by way of the operational amplifier OP2.

Next, the operation during abnormal condition will be described herein under. Because the contact resistance increases (an abnormal condition occurs) due to contact failure between the detection coil 13 or 14 and the resistor R1 or R2 during the abnormal condition, the resistance of the detection coil 13 or 14 increases apparently and the impedance of the detection coil 13 or 14 increases concomitantly. As the result, a signal having the phase with deviation from the phase of the output signal generated during the normal condition is generated from the operational amplifier OP1.

Because the AC voltage Vosc generated by means of the oscillator 21 and supplied by way of the current amplifier 22 is applied to the input (+) terminal of the comparator CP1 and the reference voltage Vref is applied on the input (−) terminal, the input waveform is a sine wave and the output waveform that is generated at that time is a positive potential rectangular waveform. This point is the same as that in the normal condition.

The AC voltage Vosc generated from the oscillator 21 and supplied by way of the current amplifier 22 is applied on the input (−) terminal of the comparator CP2 and the output Vdef (sine wave) of the operational amplifier OP1 is supplied to the input (+) terminal of the comparator CP2. Because at that the impedance of the detection coil 13 or 14 is increased as described herein above, though the output waveform of the comparator CP2 is the negative potential rectangular waveform, the phase deviation occurs from the output waveform of the comparator CP1.

Therefore, the output composite waveform of the comparators CP1 and CP2 is a rectangular waveform having the width corresponding to the phase deviation between the output waveforms, and this composite waveform is applied to the transistor TR, and the transistor TR is turned ON (conductive). The ON state of the transistor TR means that a control signal is generated from the monitoring unit 25 when an abnormal condition is detected.

Because the input (+) terminal of the operational amplifier OP2 of the sub smoothing/neutralizing adjusting unit 27 is grounded when the monitoring unit 25 detects the abnormality and the transistor TR is turned ON (conductive), the output of the sub amplifying/full-wave rectifying unit 24 supplied to the input (−) terminal is not supplied by way of the operational amplifier OP2. In other words, when the contact failure occurs between the detection coil 13 or 14 and the resistor R1 or R2 to cause the circuit abnormality associated with increased contact resistance, the output of the detected torque is inhibited.

Next, the second example of the above-mentioned monitoring unit will be described hereinafter. When the differential signal Vdef between the output signals that appear at both ends of the detection coils 13 and 14 exceeds the predetermined voltage value Vref3 in the predetermined time width tm around the point where the AC voltage (sine wave) generated from the oscillator 21 intersects the middle point thereof (points of 0 degree and 180 degrees of a sine wave), that is, when the phase difference between the reference voltage Vref and the AC voltage generated from the oscillator 21 exceeds the allowance, the situation is judged to be abnormal.

Figure 8:
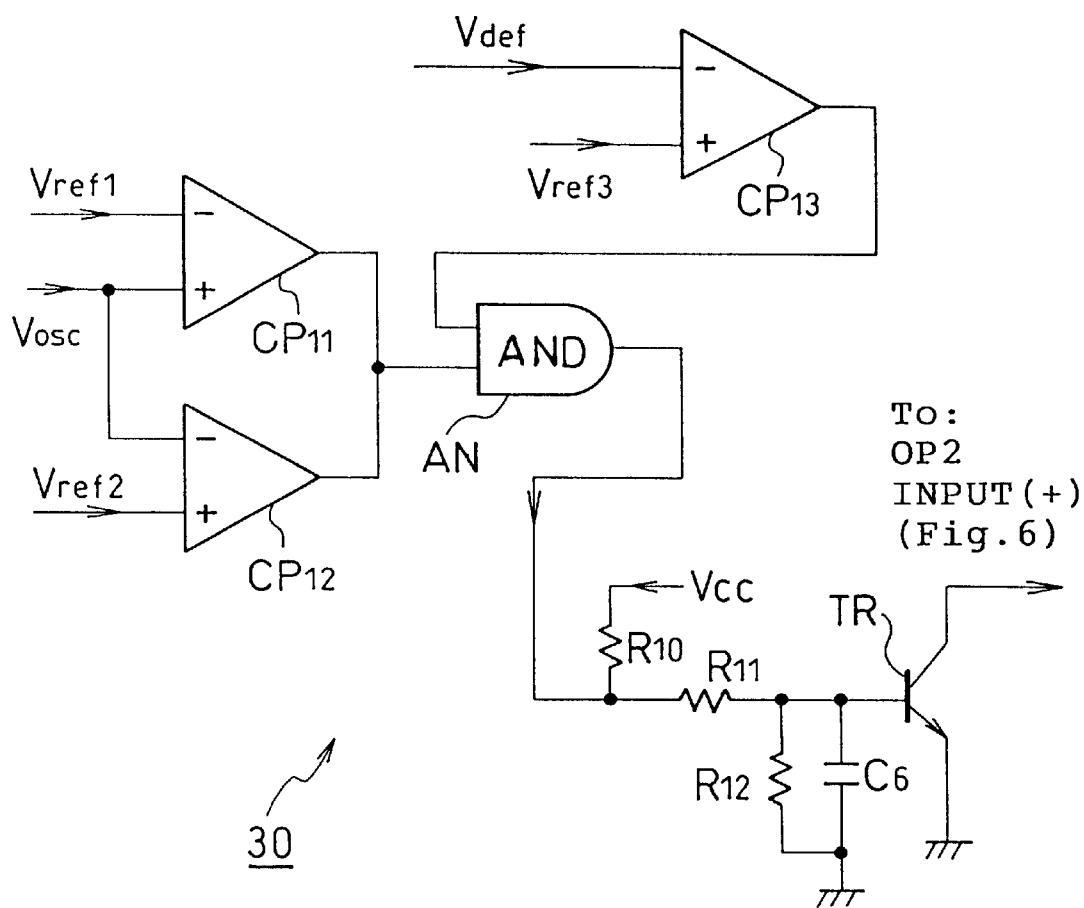
FIG. 8 is a circuit block diagram illustrating the second embodiment of the monitoring unit.

FIG. 8 is a circuit block diagram for illustrating the second embodiment of the above-mentioned monitoring unit, and this monitoring unit is replaceable for the above-mentioned monitoring A torque detection bridge circuit comprising the first arm having a detection coil 13 and a resistor R1 connected in series and the second arm having a detection coil 14 and a resistor R2 connected in series, an oscillator 21, a current amplifier 22, sub amplifying/full-wave rectifying unit 24, and sub smoothing/neutralizing adjusting unit 27 are connected around the monitoring unit 30 of the second embodiment. The structure and the operation of these circuit components are the same as those of the above-mentioned first embodiment, the description is omitted, and the monitoring unit 30 will be described hereinafter.

The monitoring unit 30 comprises three comparators CP11, CP12, and CP13, an AND circuit AN, namely logical product operation circuit, a transistor TR, and resistors R10, R11, and R12, and a capacitor C6.

An AC voltage Vosc generated by means of the oscillator 21 and supplied by way of a current amplifier 22 is applied to the input (+) terminal of a comparator CP11, and the first reference voltage Vref1 is applied on the input (−) terminal of CP11. The second reference voltage Vref2 is applied to the input (+) terminal of the comparator CP12 and the AC voltage Vosc generated by means of the oscillator 21 and supplied by way of the current amplifier 22 is applied to the input (−) terminal of CP12. The respective output signals of the comparators CP11 and CP12 are composed, and the composite signal is supplied to the first input terminal of the AND circuit AN.

The third reference voltage Vref3 is applied on the input (+) terminal of the comparator CP13, and the output signal Vdef of the operational amplifier OP1 of the sub amplifying/full-wave rectifying unit 24 is applied on the input (−) terminal of CP13. The output of the comparator CP13 is supplied to the second input terminal of the AND circuit AN.

The output terminal of the AND circuit AN is connected to the base of a transistor TR by way of the resistor 11, and the signal renders the transistor TR conductive when the AND circuit AN is turned ON.

Figure 9:
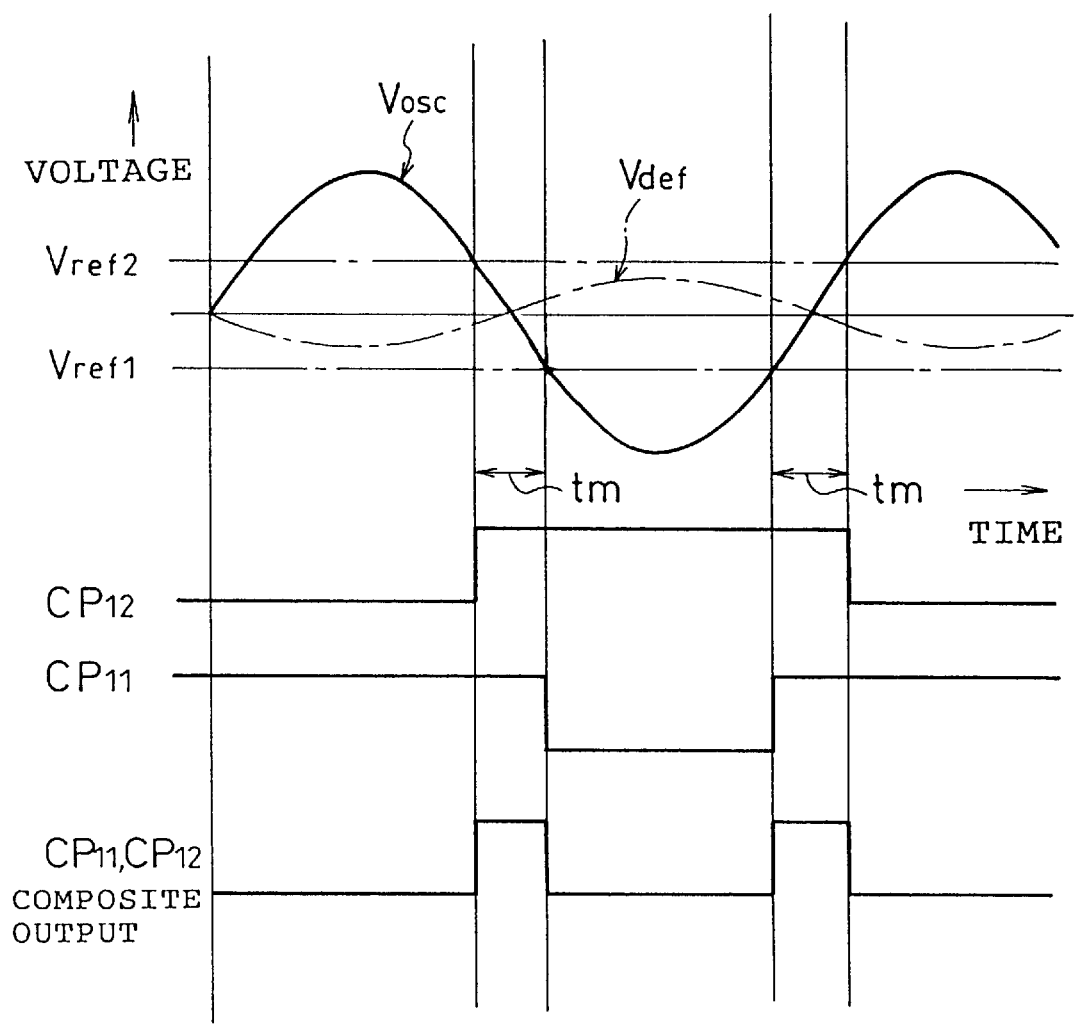
FIG. 9 is a diagram showing the generation of a signal having a predetermined time width tm.

The operation of the monitoring unit 30 will be described hereinafter with reference to FIG. 9 and FIG. 10. At first, the rectangular wave signal having a predetermined time width tm is prepared to determine the timing for executing abnormality detection.

The AC voltage Vosc is applied on the input (+) terminal of the comparator CP11, the first reference voltage Vref1 is applied on the input (−) terminal of CP11, furthermore the second reference voltage Vref2 is applied on the input (+) terminal of the comparator CP12, and the AC voltage Vosc is applied on the input (−) terminal of CP12. The output waveforms of the comparators CP11 and CP12 and the composite output waveform of these outputs are shown in FIG. 9, and a signal having a predetermined time width tm is obtained by composing the respective outputs of the comparators CP11 and CP12. The signal is supplied to the first input terminal of the AND circuit AN (refer to FIG. 8) as described herein above.

Next, to determine whether the voltage of the differential signal between output signals that appear on both ends of the detection coils 13 and 14 is equal to or smaller than the predetermined voltage value Vref3 or not, the reference voltage Vref3 that is served as a reference is applied on the input (+) terminal of the comparator CP13 for detecting abnormality, and the output signal Vdef of the operational amplifier OP1 of the sub amplifying/full-wave rectifying unit 24 is supplied to the (−) terminal of CP13. The output signal of the comparator CP13 is supplied to the second input terminal of the AND circuit AN (refer to FIG. 8).

Figure 10A:
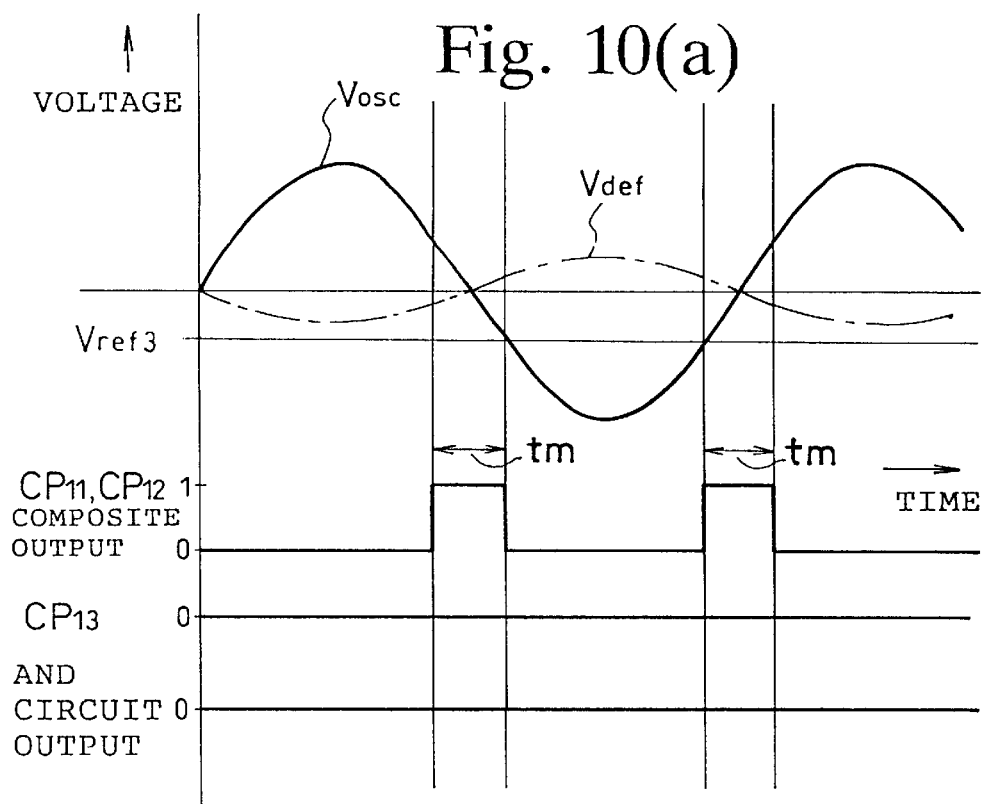
FIG. 10(a) and FIG. 10(b) are diagrams showing the composite waveform of comparators CP11 and CP12, the output waveform of a comparator CP13 and the output waveform of an AND circuit in normal condition an abnormal condition.

The operation in normal condition will be described with reference to FIG. 10(a). In normal condition, no phase deviation occurs in the output signal Vdef of the operational amplifier OP1, and the voltage of output signal Vdef is equal to or lower than the reference voltage Vref3 always, and the output of the comparator CP13 is zero (0). Because the logical product of the output signal of the comparator CP13 and the signal having the predetermined time width tm (synthesized output of the comparators CP11 and CP12) is formed in the AND circuit AN, the output of the AND circuit is OFF (0), the transistor TR is not rendered conductive, and no abnormality is detected.

Figure 10B:
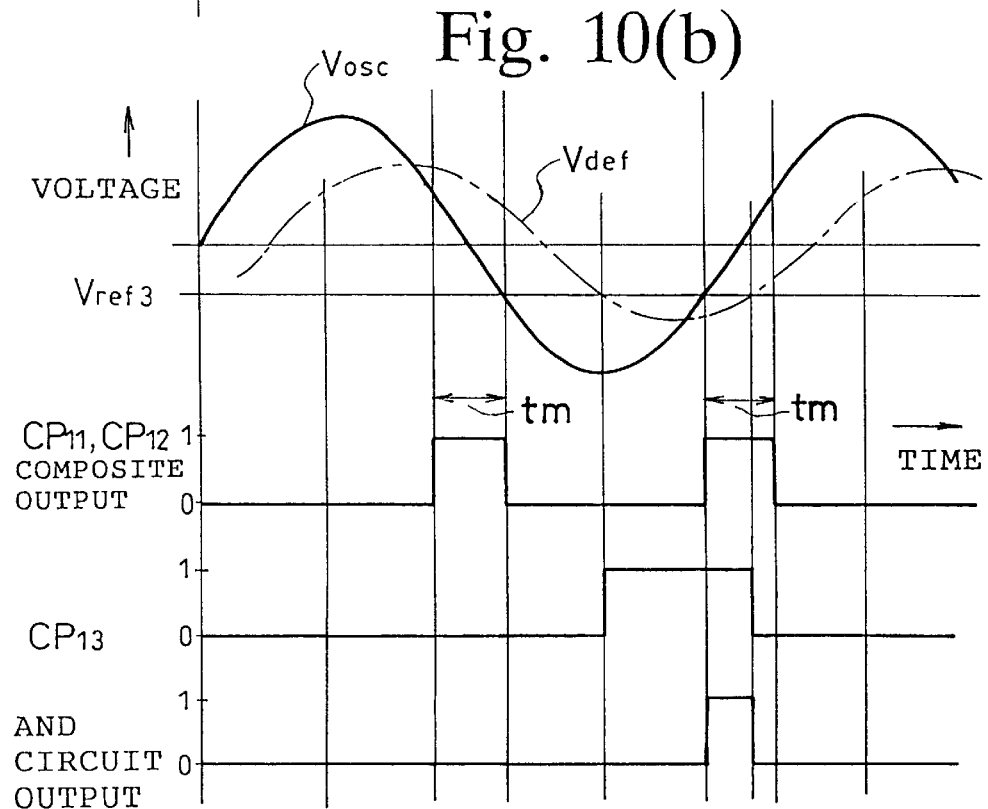

Next, the operation in abnormal condition will be described with reference to FIG. 10(b). When a phase deviation occurs in the output signal Vdef of the operational amplifier OP1 and the voltage of the output signal Vdef becomes equal to or lower than the reference voltage Vref3 in the predetermined time width tm, the occurrence of abnormality is detected.

The comparator CP13 generates one (1) when the voltage of the output signal Vdef of the operational amplifier OP1 is equal to or lower than the reference voltage Vref3; on the other hand it generates zero (0) when the voltage of the output signal Vdef of the operational amplifier OP1 is equal to or higher than the reference voltage Vref3.

Because the logical product of the output signal of the comparator CP13 and the signal having the predetermined time width tm is formed in the AND circuit AN, and the output of the AND circuit AN is turned ON (1) when the output of the comparator CP13 is equal to or lower than the reference voltage Vref3 in the predetermined time width tm, the transistor TR is rendered conductive during the ON time period, and the occurrence of the abnormality is detected.

The circuit structure of the monitoring unit described in the first and second embodiments herein above is only the example, other variously modified circuits having the same function will be constituted. Such modified circuits falls in the scope of the circuit design that will occur to those skilled in the art, and the present invention is by no means limited to the exemplified circuit structures.

Next, the third example of the embodiment will be described. The torque detection circuit 40 of the third example is different from that of the first example described with respect to FIG. 5. The bridge circuit comprises two pairs of resistor elements of R41 and R42 and of R51 and R52 instead of resistors R1 and R2.

The monitoring unit 25 in the first example is omitted, and instead of it, there is provided a judging unit 50 for detecting the differential signal VD between the output signal of the main smoothing/neutralizing adjusting unit 26 and the output signal of the sub smoothing/neutralizing adjusting unit 27 and for judging the failure of the circuit components based on whether the differential signal DV is zero or not. Another structure is the same as that shown in FIG. 5, the same components as shown FIG. 5 are given the same characters, and the detailed description is omitted.

Figure 11:
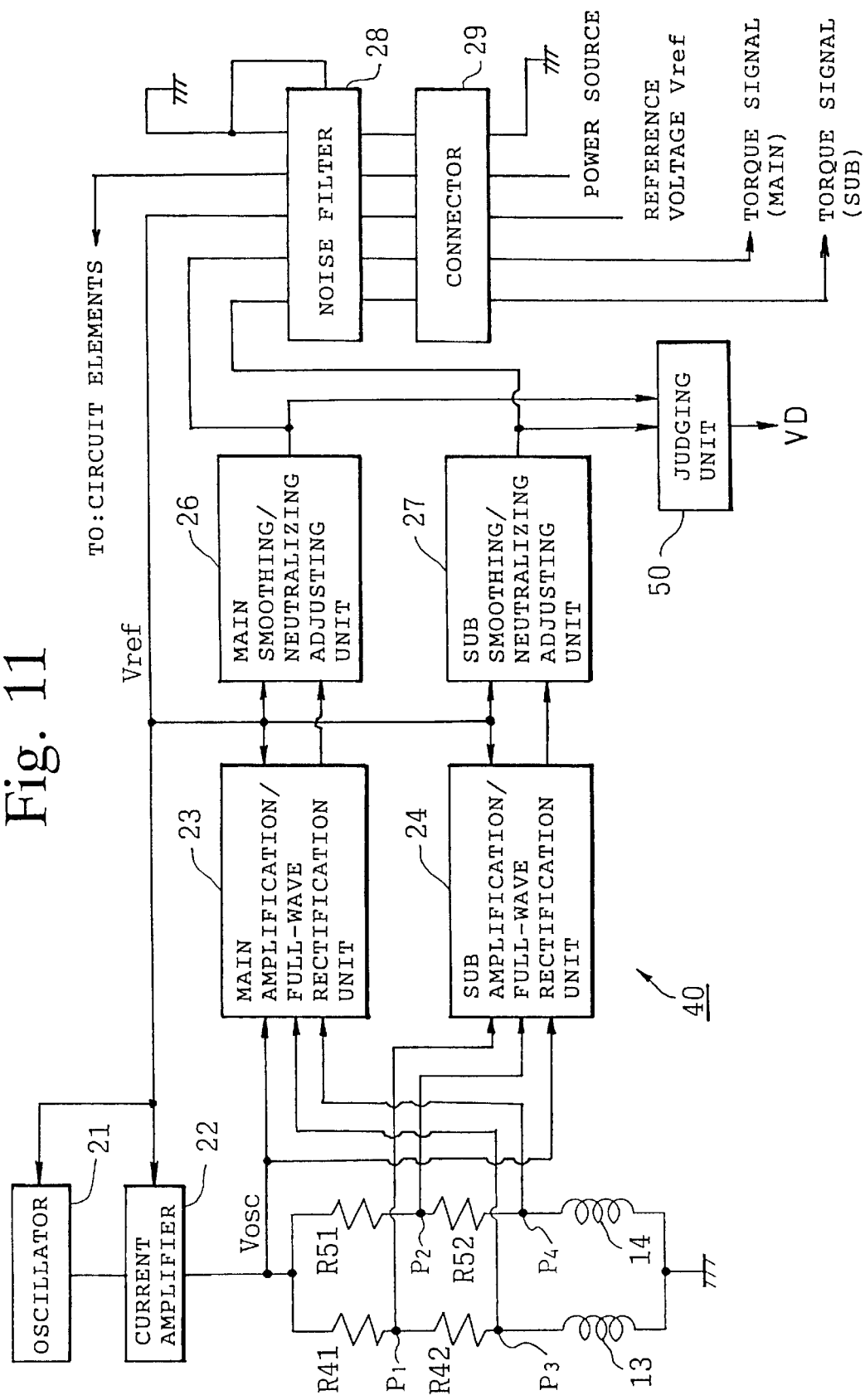
FIG. 11 is a block diagram illustrating the third embodiment of the torque detection circuit.

The judging unit 50 may be provided with a control circuit not shown in the drawing to which the output signal generated from the main smoothing/neutralizing adjusting unit 26 and supplied by way of the connector 29 and the output signal of the sub smoothing/neutralizing adjusting unit 27 are supplied. FIG. 11 is a block diagram for illustrating the torque detection circuit 40 of the third example. The torque detection circuit 40 is connected to the controller not shown in the drawing by way of the connector 29, the power source voltage V and the reference voltage Vref are supplied from the control unit to circuit components by way of the noise filer 28, on the other hand the detected torque signal is supplied to the controller by way of the noise filter 28.

The bridge circuit for detecting the torque comprises the first arm having a detection coil 13, resistors R41 and R42 that are connected in series and the second arm having a detection coil 14, and resistors R51 and R52.

An oscillator 21 receives the power source voltage V and the reference voltage Vref to generate an AC voltage having a predetermined frequency. The output AC voltage is amplified by means of a current amplifier 22, and the amplified AC voltage Vosc is supplied to the first arm comprising the detection coil 13, and the resistors R41 and R42, and the second arm comprising the detection coil 14, and the resistors R51 and R52.

The characteristics of the detection coils 13 and 14 have been adjusted so that currents having the same magnitude flow through the first arm and the second arm of the bridge circuit and the voltage V3 that appears on the junction point P3 of the detection coil 13 is equalized to the voltage V4 that appears on the junction point P4 of the detection coil 14 when the torque is not exerted. Furthermore, the resistance value of the resistor R41 and the resistor R51 and the resistance value of the resistor R42 and the resistance value R52 have been adjusted so that the voltages that appears on the junction point P1 between the resistor R41 and the resistor R42 is equalized to the voltage that appears on the junction point P2 between the resistor R51 and the resistor R52.

The voltage V3 that appears on the junction point P3 of the detection coil 13 and the voltage V4 that appears on the junction point P4 of the detection coil 14 are supplied to the main amplifying/full-wave rectifying unit 23, and converted to a differential signal Vdef–1 (=V3–V4), the differential signal is amplified and rectified, the output waveform is adjusted by means of the main smoothing/neutralizing adjusting unit 26, and then supplied to the control unit by way of the noise filter 28 as the main torque signal.

On the other hand, the voltage V1 of the junction point P1 between the resistor R41 and the resistor R42 and the voltage V2 of the junction point P2 between the resistor R51 and the resistor R52 are supplied to the sub amplifying/full-wave rectifying unit 24 and converted to the differential voltage signal Vdef–2 (=V1–V2), the differential voltage signal Vdef–2 is amplified and rectified the output waveform is adjusted by means of the sub smoothing/neutralizing adjusting unit 27, and then supplied to the control unit by way of the noise filter 28 as the sub torque signal.

The judging unit 50 detects the differential signal VD between the differential voltage signal Vdef–1 generated from the main smoothing/neutralizing adjusting unit 26 and the differential voltage signal Vdef–2 generated from the sub smoothing/neutralizing adjusting unit 27, and determines whether the differential signal VD is zero or not.

If the result is zero, then the circuit components of the bridge circuit is determined to be normal, and on the other hand if the differential signal VD is not zero, then the circuit component of the bridge circuit is determined to be abnormal, and the necessary action is operated, for example, a notice is displayed or the detection torque signal is disabled.

The operation of the torque detection circuit 40 and the failure judgment of the circuit components of the bridge circuit by means of the judging unit 50 will be described.

At first, the state will be described in which the components of the bridge circuit are normal and no torque is exerted.

In this case, because no torque is generated, the impedance of the detection coil 13 is equal to the impedance of the detection coil 14, also the resistance value of the resistor R41 and the resistor R51 has been equalized to the resistance value of the resistor R42 and the resistor R52, as the result a current I1 flowing through the first arm (the arm included in the detection coil 13) of the bridge circuit is equal to a current I2 flowing through the second arm (the arm included in the detection coil 14).

As the result, a voltage V3 that appears on the junction point P3 of the detection coil 13 is equal to a voltage V4 that appears on the junction point P4 of the detection coil 14, and the voltage signal Vdef–1=0 is generated from the main smoothing/neutralizing adjusting unit 26 as the differential voltage signal Vdef–1 (=V3–V4).

Furthermore, because the current I1 flowing through the first arm is equal to the current I2 flowing the second arm, a voltage V1 that appears on the junction point P1 between the resistor R41 and the resistor R42 is equal to a voltage V2 that appears on the junction point P2 between the resistor R51 and the resistor R52, and as the result the voltage signal Vdef–2=0 is generated from the sub smoothing/neutralizing adjusting unit 27 as the differential voltage signal Vdef–2 (=V1–V2).

Because the judging circuit 50 generates (0) namely {VD=(Vdef−1)−(Vdef−2)=0} as the differential voltage between the differential voltage signal Vdef−1 supplied from the main smoothing/neutralizing adjusting unit 26 and the differential voltage signal Vdef−2 supplied from the sub smoothing/neutralizing adjusting unit 27, it is judged that the components of the bridge circuit are normal.

Next, the state will be described in which the components of the bridge circuit are normal and a torque is generated.

In this case, because a torque is generated, the impedance of the detection coil 13 is not equal to the impedance of the detection coil 14. In other words, the one impedance increases and the other impedance decreases. The current I1 flowing through the first arm (the arm included in the detection coil 13) is not equal to the current I2 flowing through the second arm (the arm included in the detection coil 14). In other words, the one current increases and the other current decreases.

As the result, the voltage V3 that appears on the junction point P3 of the detection coil 13 is not equal to the voltage V4 that appears on the junction point P4 of the detection coil 14, and the main smoothing/neutralizing adjusting unit 26 generates a voltage signal having a value (X0) not equal to zero as the differential voltage signal Vdef−1 (=V3−V4). This signal is a detection torque signal that is proportional to the magnitude of the detected torque.

Because the current I1 flowing the first arm of the bridge circuit is not equal to the current I2 flowing the second arm, the voltage V1 that appears on the junction point P1 between the resistor R41 and the resistor R42 is not equal to the voltage V2 that appears on the junction point P2 between the resistor R51 and the resistor R52, and the sub smoothing/neutralizing adjusting unit 27 generates a voltage signal having a value (Y0) not equal to zero as the differential voltage signal Vdef−2 (=V1−V2). This signal is also proportional to the magnitude of the detected torque.

As described herein above, the differential voltage signal Vdef−1 (=V3−V4=X0) between the voltages that appear on the above-mentioned detection coil junction points P3 and P4 and the differential voltage signal Vdef−2 (=V1−V2=Y0) between the voltages that appear on the above-mentioned resistor junction points P1 and P2 are signals that are both proportional to the magnitude of the detected torque. Therefore, it is assumed that the amplification degree of the main smoothing/neutralizing adjusting unit 26 and the sub smoothing/neutralizing adjusting unit 27 has been set previously so that the value of the differential signal Vdef−1 (=V3−V4) is equal to the value of the differential signal Vdef−2 (=V1−V2), that is, so that the differential signal VD between the voltage signal Vdef−1 and the voltage signal Vdef−2 is {VD=Vdef−1)−(Vdef−2)=(X0-Y0)=0} while the torque detection circuit 40 is operating normally.

The degree of amplification of the main smoothing/neutralization adjusting unit 26 and the sub smoothing/neutralization adjusting unit 27 is set in the manner as described herein above, as the result the judging unit 50 generates zero (0) namely {VD=(Vdef−1)−(Vdef−2)=0} as the differential signal VD between the voltage signals Vdef−1 and Vdef−2 regardless of the magnitude of the torque as long as the components of the bridge circuit are normal.

Next, the state will be described in which the components of the bridge circuit are not normal and a torque is not generated. For the purpose of description, it is assumed that the detection coils 13 and 14 are normal. and the resistance value of any one of the resistors R41, R42, R51, and R52 is changed to high.

The impedance of the detection coil 13 is equal to the impedance of the detection coil 14 because no torque is generated, however, because the resistance value of any one of the resistors R41, R42, R51, and R52 has increased, the magnitude of the current I1 flowing through the first arm (the arm included in the detection coil 13) of the bridge circuit is not equal to that of the current I2 flowing through the second arm (the arm included in the detection coil 14).

As the result, the voltage V3 that appears on the junction point P3 of the detection coil 13 is not equal to the voltage V4 that appears on the junction point P4 of the detection coil 14, and the main smoothing/neutralizing adjusting unit 26 generates a voltage signal having a value (X1) not equal to 0 as the differential voltage signal Vdef−1. In other words, the voltage signal Vdef−1 is generated as if a torque were generated.

Because the current I1 flowing through the first arm of the bridge is not equal to the current I2 flowing through the second arm, the voltage V1 that appears on the junction point P1 between the resistor R41 and the resistor R42 is not equal to the voltage V2 that appears on the junction point P2 between the resistance R51 and the resistor R52, and as the result the sub smoothing/neutralizing adjusting unit 27 generates a voltage signal having a value (Y1) not equal to zero as the differential voltage signal Vdef−2 (=V1−V2). Usually, the value (X1) is different from the value (Y1).

The reason is that the degree of amplification of the main smoothing/neutralizing adjusting unit 26 and the sub smoothing/neutralizing adjusting unit 27 has been set previously so that the differential signal VD between the voltage signal Vdef−1 and the voltage signal Vdef−2 is equal to zero when the components of the bridge circuit operate normally as described herein above, so the value (X1) of the voltage signal Vdef−1 is not equal to the value (Y1) of the Vdef−2 when the components of the bridge circuit are not normal.

As the result, a value not equal to zero namely {DV=(Vdef−1) (Vdef−2)=(X1)−(Y1)≠} is generated from the judging unit 50 as the differential signal VD between the differential voltage signal Vdef−1 generated from the main smoothing/neutralizing adjusting unit 25 and the differential voltage signal Vdef−2 generated from the sub smoothing/neutralizing adjusting unit 27, and it is judged that any of the components of the bridge circuit is abnormal.

Next, the state will be described in which the components of the bridge circuit are not normal, and a torque is generated. Because the impedance of the detection coil 13 is not equal to the impedance of the detection coil 14, the magnitude of the current I1 flowing through the first arm (the arm included in the detection coil 13) of the bridge circuit is not equal to the magnitude of the current I2 flowing through the second arm (the arm included in the detection coil 14).

As the result, the voltage V3 that appears on the junction point P3 of the detection coil 13 is not equal to the voltage V4 that appears on the junction point P4 of the detection coil 14, and the main smoothing/neutralizing adjusting unit 26 generates a voltage signal having a value (X2) not equal to zero as the differential voltage signal Vdef−1 (=V3−V4).

Because the resistance value of any one of the resistors R41, R42, R51, and R52 has been changed, the magnitude of the current I1 flowing through the first arm of the bridge circuit is not equal to the magnitude of the current I2 flowing through the second arm, as the result the voltage V1 that appears on the junction point P1 between the resistors R41 and R42 is not equal to the voltage V2 that appears on the junction point P2 between the resistor's R51 and R52, and the sub smoothing/neutralizing adjusting unit 27 generates a voltage signal having a value (Y2) not equal to zero as the differential voltage signal Vdef-2 (=V1-V2). Herein, the value (X2) is not equal to the value (Y2) usually.

As the result, a value not equal to zero, namely {VD=(Vdef-1)-(Vdef-2)=(X2)-(Y2)≠} is generated from the judging unit 50 as the differential signal VD between the differential voltage signal Vdef-1 generated from the main smoothing/neutralizing adjusting unit 26 and the differential voltage signal Vdef-2 generated from the sub smoothing/ neutralizing adjusting unit 27, it is judged that the components of the bridge circuit are not normal.

The examples of vehicle power steering apparatus to which the torque sensor of the embodiment of the present invention is applied are described, however, as the matter of course the torque sensor of the present invention may be applied to the torque detection apparatus of various mechanical installations other than vehicle power steering apparatus.

When the circuit component that constitutes the bridge circuit of a torque sensor operates abnormally because of malfunction involving, for example, contact failure generated between a printed wiring board and a resistor or change of resistance value due to damage of the resistor itself or due to aging of the resistor, a conventional torque sensor detects the abnormal operation as if the impedance of the detection coil were changed and generates an erroneous detection torque signal, on the other hand according to the present invention, the malfunction of the circuit component that constitutes the bridge circuit is detected consistently, and a highly reliable torque sensor is realized.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should to construed as being included therein.

What is claimed is:

1. A torque sensor comprising:
   a pair of detection coils having impedances that change oppositely of each other corresponding to a torque generated in a rotation shaft;
   a bridge circuit having first and second arms comprising said pair of detection coils and a pair of resistors;
   an AC power source for supplying an AC voltage to the first and second arms of said bridge circuit;
   a voltage detecting circuit for detecting a differential voltage of AC voltages that appear on both ends of said pair of detection coils of said bridge circuit and for generating said differential voltage as a torque signal; and
   a monitoring unit that detects a phase difference between a waveform of the AC voltage applied on the first and second arms of said bridge circuit and a waveform of the differential voltage between AC voltages that appear on both ends of said pair of detection coils, and judges a resistance of said detection coils to be abnormal when the detected phase difference exceeds a predetermined value.

2. A torque sensor as claimed in claim 1, wherein two sets of said voltage detecting circuits are provided, and outputs of said two sets of voltage detecting circuits are compared with each other to thereby confirm that the torque is detected normally.

3. A torque sensor as claimed in claim 1, wherein said monitoring unit comprises a phase difference detecting circuit for detecting the phase difference between the waveform of AC voltage applied on the first and second arms of said bridge circuit and the waveform of the differential voltage between AC voltages that appear on both ends of said pair of detection coils and a judging circuit for judging the resistance of said detection coils to be abnormal when the phase difference detected by means of said phase difference detecting circuit exceeds a predetermined value.

4. A torque sensor as claimed in claim 3, wherein the resistance abnormality of said detection coils detected by means of said monitoring unit includes increased contact resistance between detection coils and resistors that are components of said bridge circuit.

5. A torque sensor as claimed in claim 3, wherein said judging circuit inhibits generation of said torque signal when the detected coil resistance is judged to be abnormal.

6. A torque sensor comprising:
   a pair of detection coils having impedances that change oppositely of each other corresponding to a torque generated in a rotation shaft;
   a pair of resistors, each of which comprises two resistor elements connected in series;
   a bridge circuit having first and second arms comprising said pair of detection coils and said pair of resistors;
   an AC power source for supplying an AC voltage to the first and second arms of said bridge circuit;
   a first voltage amplifier for receiving AC voltages that appear on both ends of said pair of detection coils of said bridge circuit and for generating a first differential voltage between input AC voltages as a main torque signal;
   a second voltage amplifier for receiving AC voltages that appear on middle points between respective two resistor elements that constitute said pair of resistors of said bridge circuit and for generating a second differential voltage between input AC voltages as a sub torque signal; and
   a judging unit for judging a failure of circuit components that constitute the bridge circuit based on a differential signal between the main torque signal generated from said first voltage amplifier and the sub torque signal generated from said second voltage amplifier.

7. A torque sensor as claimed in claim 6, wherein said judging unit judges the circuit components that constitute the bridge circuit to be normal if a difference between said main torque signal and the sub torque signal is equal to, on the other hand judges the bridge circuit to be abnormal if the difference between said main torque signal and the sub torque signal is not equal to 0.

8. A torque sensor as claimed in claim 6, wherein said judging unit inhibits generation of a torque signal if the circuit components that constitute the bridge circuit are judged to be abnormal.

* * * * *

UNITED STATES PATENT AND TRADEMARK OFFICE
CERTIFICATE OF CORRECTION

PATENT NO.     : 6,456,090 B1
DATED          : September 24, 2002
INVENTOR(S)    : Takeshi Ishikawa et al.

It is certified that error appears in the above-identified patent and that said Letters Patent is hereby corrected as shown below:

Column 2,
Line 43, after "shaft", insert -- . --.
Line 58, after "CP13", insert -- , --.
Line 59, after "condition", delete "an" and insert -- and --.

Column 3,
Line 48, after "on", delete ".".

Column 7,
Line 16, delete "unit .24", and insert -- unit 24 --.

Column 11,
Line 46, delete "filer", and insert -- filter --.

Column 14,
Lines 37 and 38, delete "{DV=(Vdef-1) (Vdef-2)=(X1)-(Y1)≠}", and insert -- {DV=(Vdef-1)-(Vdef-2)=(X1)-(Y1)≠0} --.

Column 15,
Lines 5 and 6, delete "{VD=(Vdef-1)-(Vdef-2)=(X2)-(Y2)≠}", and insert -- { VD=(Vdef-1)-(Vdef-2)=(X2)-(Y2)≠0 } --.

Column 16,
Line 53, delete "equal to,", and insert -- equal to 0, --.

Signed and Sealed this

Eleventh Day of November, 2003

JAMES E. ROGAN
*Director of the United States Patent and Trademark Office*